(12) United States Patent
Lin

(10) Patent No.: US 7,539,163 B2
(45) Date of Patent: May 26, 2009

(54) SYSTEM AND METHOD FOR A HANDOFF IN A MULTIMEDIA MOBILE NETWORK

(76) Inventor: Jeou-Kai Lin, 1286 Colleen Way, Campbell, CA (US) 95008

(*) Notice: Subject to any disclaimer, the term of this patent is extended or adjusted under 35 U.S.C. 154(b) by 702 days.

(21) Appl. No.: 10/863,649

(22) Filed: Jun. 7, 2004

(65) Prior Publication Data

US 2006/0002342 A1    Jan. 5, 2006

(51) Int. Cl.
*H04W 4/00* (2009.01)
(52) U.S. Cl. ............... 370/331; 370/328; 370/342; 370/317; 370/318; 455/522; 455/67.11
(58) Field of Classification Search ............ 370/331, 370/328, 342, 317, 318; 455/522, 67.11
See application file for complete search history.

(56) References Cited

U.S. PATENT DOCUMENTS

| | | | |
|---|---|---|---|
| 6,304,552 B1 * | 10/2001 | Chapman et al. | 370/232 |
| 6,757,520 B2 * | 6/2004 | Attar et al. | 455/63.1 |
| 6,775,258 B1 * | 8/2004 | van Valkenburg et al. | 370/338 |
| 6,850,499 B2 * | 2/2005 | Wheatley et al. | 370/328 |
| 6,990,343 B2 * | 1/2006 | Lefkowitz | 455/436 |
| 7,050,405 B2 * | 5/2006 | Attar et al. | 370/282 |
| 7,050,803 B2 * | 5/2006 | Celedon et al. | 455/436 |
| 7,139,274 B2 * | 11/2006 | Attar et al. | 370/395.4 |
| 2004/0064581 A1 * | 4/2004 | Shitama et al. | 709/238 |
| 2004/0203863 A1 * | 10/2004 | Huomo | 455/456.1 |
| 2006/0099952 A1 * | 5/2006 | Prehofer | 455/440 |
| 2006/0291389 A1 * | 12/2006 | Attar et al. | 370/230 |

* cited by examiner

*Primary Examiner*—Matthew D Anderson
*Assistant Examiner*—Minh D Dao
(74) *Attorney, Agent, or Firm*—Schein & Cai LLP; James Cai

(57) ABSTRACT

A method for handing off a connection of a mobile device from a first access point to a second access point in an Internet Protocol-based multimedia mobile network includes the steps of scanning the network for available access points, comparing a connection strength of each available access point to a pre-determined margin, authenticating access points determined to be above the pre-determined margin, adding the authenticated access points to an association table; checking a connection strength to the first access point to the pre-determined margin, selecting an authenticated access point as the second access point if the connection strength to the first access point is below the pre-determined margin, and removing the first access point from the association table.

3 Claims, 4 Drawing Sheets

| Access Point (AP) | IP Address | Authenticated? |
|---|---|---|
| Current AP | 121.24.1.05 | YES |
| AP 2 | 111.14.1.06 | YES |
| AP 3 | 21.214.10.07 | YES |

400

| Access Point (AP) | IP Address | Authenticated? |
|---|---|---|
| Current AP | 121.24.1.05 | YES |
| AP 2 | 111.14.1.06 | YES |
| AP 3 | 21.214.10.07 | YES |

SYSTEM AND METHOD FOR A HANDOFF IN A MULTIMEDIA MOBILE NETWORK

BACKGROUND OF THE INVENTION

The present invention generally relates to mobile communications systems and more particularly to a system and method for a handoff in an Internet Protocol (IP) based multimedia mobile network.

In a mobile communications system such as an IP based multimedia mobile network, it is critical that continuity and quality of service be maintained when a mobile end user moves between coverage areas associated with system access points. This is particularly true in the case of real-time applications such as VoIP, video over IP, teleconferencing, and instant messaging. It is generally recognized that connection latency between mobile devices cannot exceed 50 milliseconds. Current techniques for switching between one access point and another require hundreds of milliseconds.

Prior art systems and methods for providing handoff management include a system utilizing the concept of an anchor as disclosed in U.S. Pat. No. 6,160,804 entitled "Mobility Management for a Multimedia Mobile Network". An anchor is a network node that is assigned to a mobile user station and acts as a permanent node, until deleted or changed, to which packets may be intermediately sent. The anchor then passes the packets on to the mobile station, regardless of where the mobile station has moved to in the system. Thus packets are directed to an anchor which then directs the packets to the mobile station. If a mobile station moves a sufficient distance from its anchor, the system makes a decision to change the anchor of the mobile station to be a closer network node so as to optimize packet routing.

Another handoff management system is disclosed in U.S. Pat. No. 6,735,202 entitled "Mobility Management Techniques for Use in an Internet Protocol-Based Multimedia Mobile Network". Each network node is equipped with a handoff module that is responsible for collecting relevant information from neighboring nodes. Mobiles communicating with the network node also assist in handoff decisions by providing signal strength information from neighboring nodes. Based on the information at its disposal, the handoff manager makes the decisions as to when and to which node a mobile should handoff.

While the systems and methods of the prior art provide for handoff management, there continues to be a need for a system and method for a handoff in an IP-based multimedia mobile network which further reduces connection latency. The system and method include creating a plurality of virtual association clients in a mobile device. The virtual association clients establish associations between the mobile device and a plurality of access points without establishing a connection between the mobile device and the associated access points.

SUMMARY OF THE INVENTION

In accordance with one aspect of the invention, a method for handing off a connection of a mobile device from a first access point to a second access point in an Internet Protocol-based multimedia mobile network includes the steps of scanning the network for available access points, comparing a connection strength to the mobile device of each available access point to a pre-determined margin, authenticating access points determined to be above the pre-determined margin, adding the authenticated access points to an association table; comparing a connection strength to the first access point to the pre-determined margin, selecting an authenticated access point as the second access point if the connection strength to the first access point is below the pre-determined margin, and removing the first access point from the association table.

In accordance with another aspect of the invention, a system for handing off a connection of a mobile device from a first access point to a second access point in an Internet Protocol-based multimedia mobile network includes a mobile device coupled to the first access point, the mobile device operable to scan the network for available access points, compare a connection strength of each available access point to a pre-determined margin, authenticate access points determined to be above the pre-determined margin, add the authenticated access points to a n association table, check a connection strength to the first access point to the pre-determined margin, select an authenticated access point as the second access point if the connection strength to the first access point is below the pre-determined margin, and remove the first access point from the association table.

In accordance with yet another aspect of the invention, a method for handing off a connection of a mobile device from a first access point to a second access point in an Internet Protocol-based multimedia mobile network includes the steps of scanning the network for available access points, comparing a connection strength to the mobile device of each available access point to a pre-determined margin, authenticating access points determined to be above the pre-determined margin, adding the authenticated access points to an association table, comparing a connection strength to the first access point to the pre-determined margin, selecting an authenticated access point as the second access point if the connection strength to the first access point is below the pre-determined margin, connecting the mobile device to the second access point, and removing the first access point from the association table.

These and other features, aspects and advantages of the present invention will become better understood with reference to the following drawings, description and claims.

BRIEF DESCRIPTION OF THE DRAWINGS

FIG. 4 is an association table in accordance with the invention.

DETAILED DESCRIPTION OF THE INVENTION

The following detailed description is of the best mode of carrying out the invention. The description is not to be taken in a limiting sense, but is made merely for the purpose of illustrating the general principles of the invention, since the scope of the invention is best defined by the appended claims.

The present invention generally provides a system and method for a handoff in an IP-based multimedia mobile network which includes creating a plurality of virtual association clients in a mobile device. The virtual association clients establish associations between the mobile device and a plurality of access points without establishing a connection between the mobile device and the associated access points.

Figure 1:
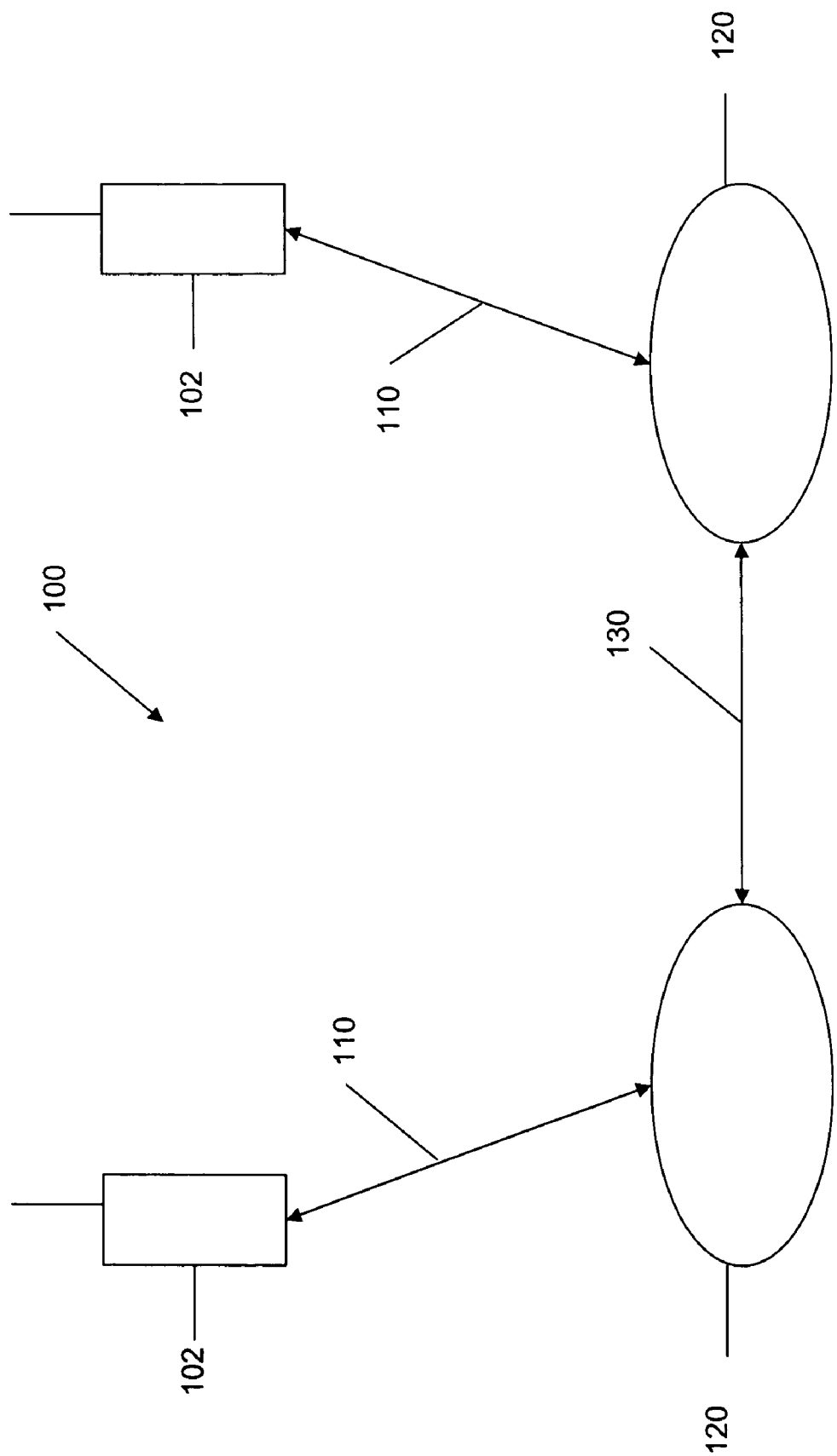
FIG. 1 is a schematic representation of a mobile communications system in accordance with the invention.

With reference to FIG. 1, a mobile communication system generally designated 100 may include a plurality of mobile devices 102 coupled to access points 120 via links 110.

Access points 120 are coupled via link 130. Mobile devices 102 may include wireless telephones and other multimedia communication devices. Access points 120 may include fixed or mobile routers, network nodes, and gateways. Links 110 and 130 are preferably wireless links. While only two mobile devices 102 and two access points 120 are shown, it will be appreciated by those skilled in the art that the system and method of the invention may accommodate many such mobile devices 102 and access points 120.

Figure 2:
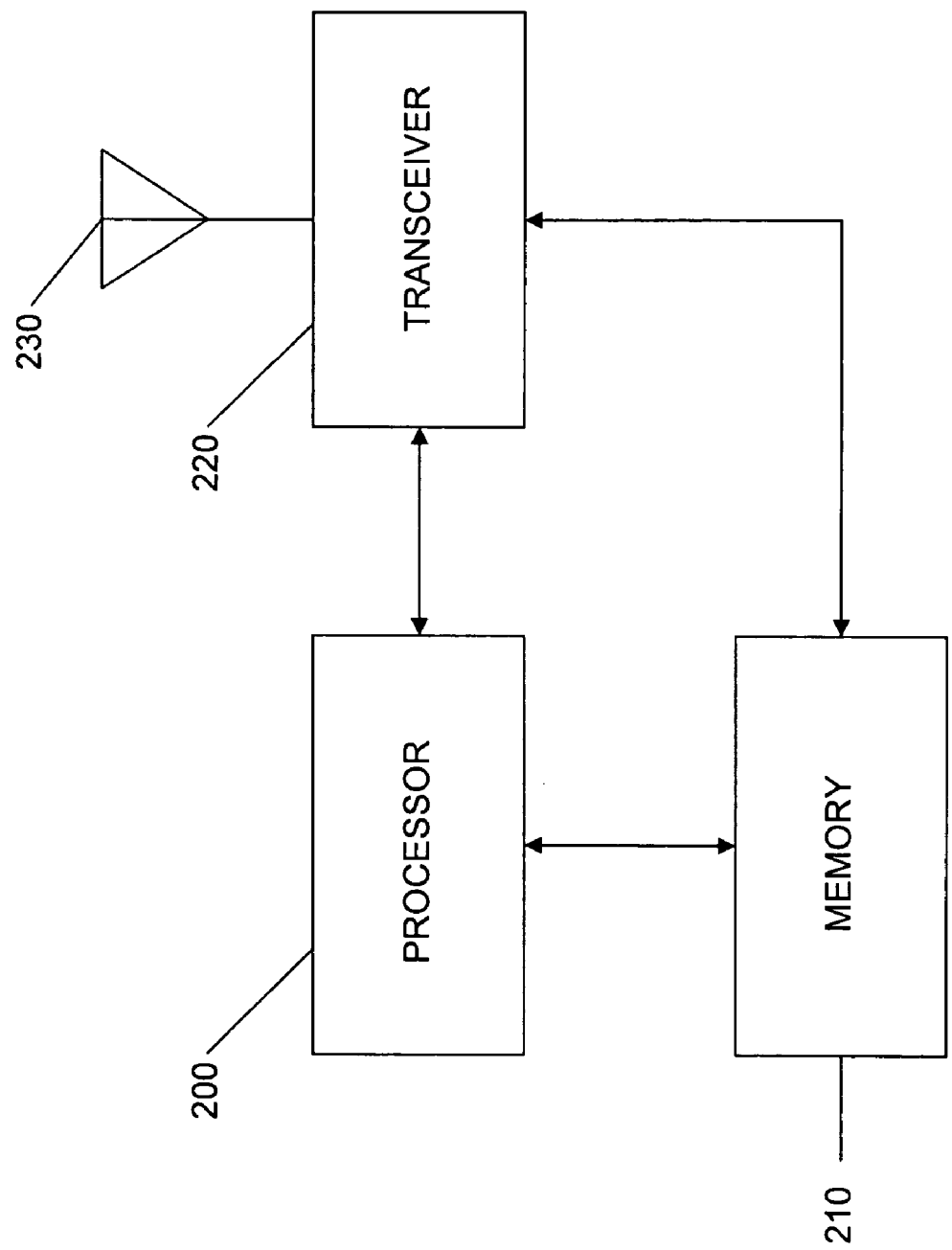
FIG. 2 is a schematic representation of a mobile device and an access point in accordance with the invention.

As shown in FIG. 2, mobile devices 102 and access points 120 may include a processor 220 coupled to a memory 210 and a transceiver 220. An antenna 230 may be coupled to transceiver 220. Processor 220 may be operable to perform the method steps a handoff method in accordance with one aspect of the invention. Memory 210 may be operable to store program instructions for carrying out the method steps and for storing association tables as described herein.

Figure 3:
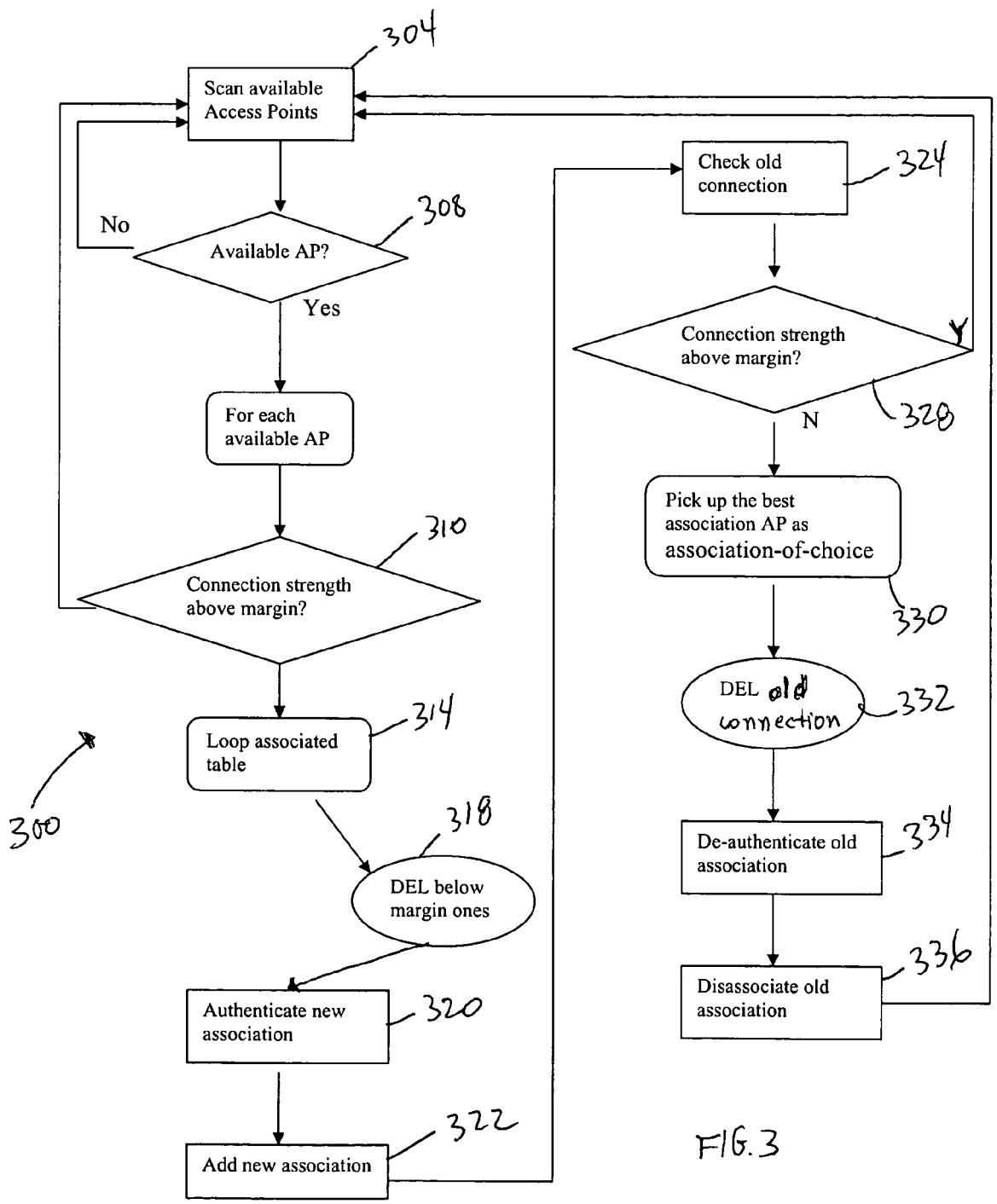
FIG. 3 is a flow chart of a handoff method in accordance with the invention.

A method for a handoff in an IP-based multimedia mobile network from a first access point to which a mobile device 102 may be connected to a second access point to which the mobile device 102 is not yet connected, the method generally designated 300, is shown in FIG. 3. In a step 304 second access points 120 available to a mobile device 102 may be scanned. Availability of second access points 120 may be determined by factors including signal strength and signal quality. In a step 308, a determination is made whether any second access points 120 are available. If no second access points 120 are available, the method returns to step 304, else in a step 310 a connection strength is evaluated for each available second access point 120.

If the connection strength for any second access point 120 is not above a pre-determined margin the method returns to step 304, else in a step 314 an association table 400 (FIG. 4) may be looped. Second access points 120 whose connection strength is below the pre-determined margin may be deleted from the association table 400 in a step 318. Second access points 120 whose connection strength is above the pre-determined margin may be authenticated in a step 320. Authentication may include establishing a virtual connection between the mobile device 102 and the second access point 120. In a step 322 each authenticated second access point 120 may be added to the association table 400 and a virtual association client sent to the mobile device 102.

In a step 324 a connection strength of the first access point 120 of the mobile device 102 may be checked. The connection strength of the first access point 120 may be compared to the pre-determined margin in a step 328 and if the connection strength is above the pre-determined margin the method returns to step 304, else in a step 330 the second access point 120 having the best signal strength and signal quality may be selected as an association of choice and the mobile device 102 may be connected to the association of choice access point 120. In a step 332 the first access point 120 is deleted from the association table 400. In a step 334 the first access point 102 may be de-authenticated and in a step 336, removed from the association table 400. The method then returns to step 304.

A system for providing a handoff in an IP-based multimedia mobile network may include program instructions stored in memory 210 for execution by processor 200 of method 300.

It should be understood, of course, that the foregoing relates to preferred embodiments of the invention and that modifications may be made without departing from the spirit and scope of the invention.

I claim:

1. A method of handing off a connection of a mobile device from a first access point to a second access point in a multimedia mobile network comprising the steps of:
   the mobile device scanning the network for available access points;
   the mobile device comparing a connection strength to the mobile device of each available access point to a pre-determined margin;
   the mobile device authenticating access points determined to be above the pre-determined margin;
   the mobile device adding the authenticated access points to an association table;
   the mobile device comparing a connection strength to the first access point to the pre-determined margin;
   the mobile device selecting an authenticated access point as the second access point if the connection strength to the first access point is below the pre-determined margin; and
   the mobile device removing the first access point from the association table after selecting the authenticated access point as the second access point.

2. A system for handing off a connection of a mobile device from a first access point to a second access point in a multimedia mobile network comprising:
   a mobile device coupled to the first access point, the mobile device operable to scan the network for available access points, compare a connection strength of each available access point to a pre-determined margin, authenticate access points determined to be above the pre-determined margin, add the authenticated access points to an association table, compare a connection strength to the first access point to the pre-determined margin, select an authenticated access point as the second access point if the connection strength to the first access point is below the pre-determined margin, and remove the first access point from the association table after selecting the authenticated access point as the second access point.

3. A method for handing off a connection of a mobile device from a first access point to a second access point in a multimedia mobile network comprising the steps of:
   the mobile device scanning the network for available access points;
   the mobile device comparing a connection strength to the mobile device of each available access point to a pre-determined margin;
   the mobile device authenticating access points determined to be above the pre-determined margin;
   the mobile device adding the authenticated access points to an association table;
   the mobile device comparing a connection strength to the first access point to the pre-determined margin;
   the mobile device selecting an authenticated access point as the second access point if the connection strength to the first access point is below the pre-determined margin;
   the mobile device connecting the mobile device to the second access point; and
   the mobile device removing the first access point from the association table.

* * * * *